Figure 10:
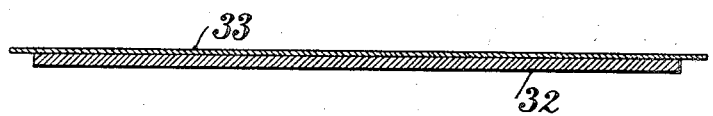

Sept. 2, 1924.
A. TOUSSAINT ET AL
AIRCRAFT CONSTRUCTION
Filed March 1, 1922    3 Sheets-Sheet 1
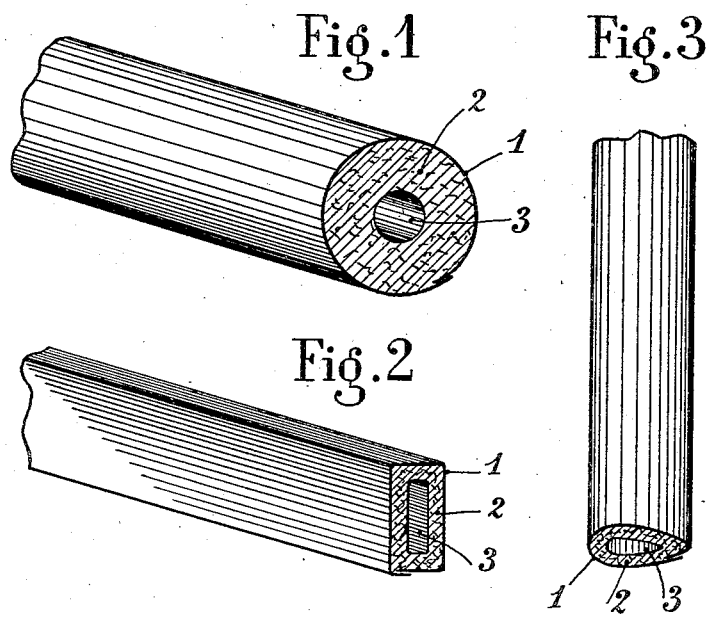
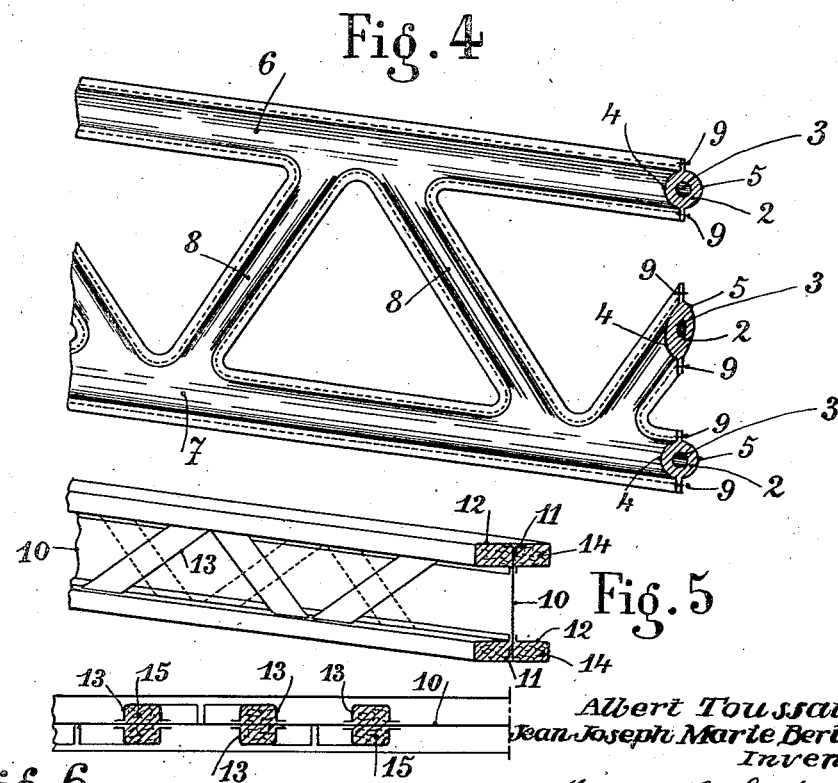
Albert Toussaint
Jean Joseph Marie Bertrand
Inventors.
By William C. Linton
Attorney.

Sept. 2, 1924.
A. TOUSSAINT ET AL
AIRCRAFT CONSTRUCTION
Filed March 1, 1922      3 Sheets-Sheet 2
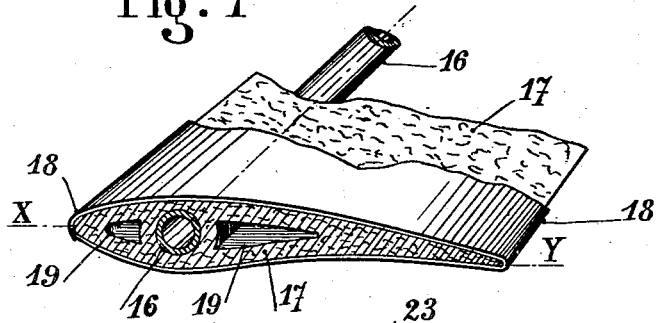
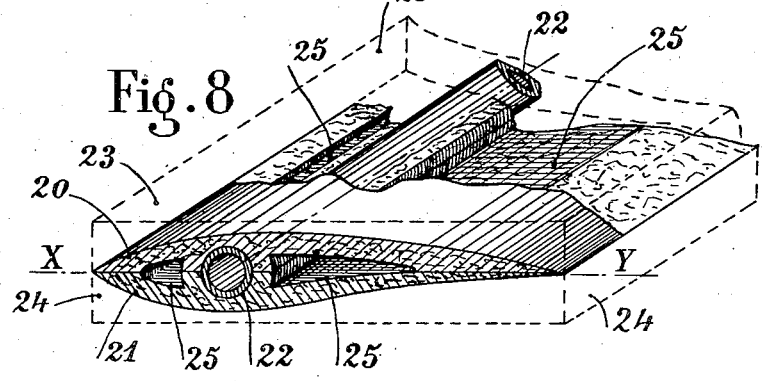
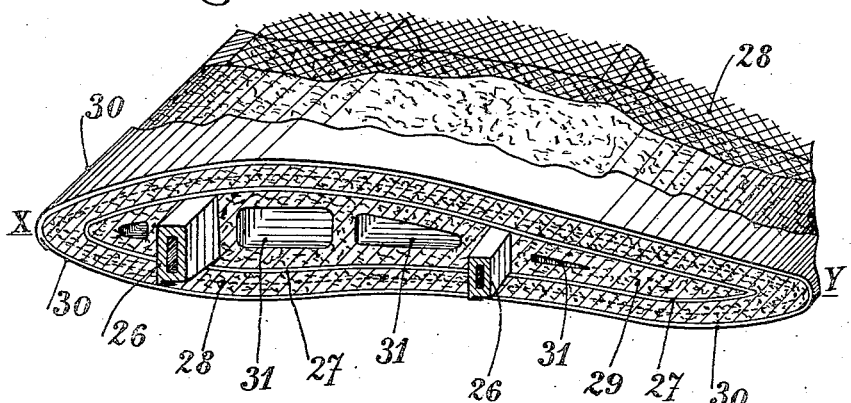
Albert Toussaint.
Jean Joseph Marie Bertrand.
Inventors.
By William C. Linton
Attorney.

Patented Sept. 2, 1924.

1,507,143

UNITED STATES PATENT OFFICE.

ALBERT TOUSSAINT, OF ST. CYR, AND JEAN JOSEPH MARIE BERTRAND, OF PARIS, FRANCE, ASSIGNORS OF ONE-THIRD TO JOSE LUIS SANCHEZ-BESA, OF SEVRES, DEPARTMENT OF SEINE, FRANCE.

AIRCRAFT CONSTRUCTION.

Application filed March 1, 1922. Serial No. 540,323.

*To all whom it may concern:*

Be it known that we, ALBERT TOUSSAINT, a citizen of the Republic of France, and residing in St. Cyr l'Ecole, Department of Seine-et-Oise, and JEAN JOSEPH MARIE BERTRAND, a citizen of the Republic of France, and residing in Paris, Department of Seine, France, have invented certain new and useful Improvements in Aircraft Construction, of which the following is a specification.

Current practice in light construction work, and particularly in aircraft construction, has shown the necessity of spreading out the material in order to provide the greatest possible moment of inertia for a given weight of material. But progress in this direction was soon arrested by the lack of rigidity in the thin elements such as sheet metal, which become distorted, or elements of some length such as struts, which are subject to bending, as well as to vibrations and to sonorous effects, so that for these reasons manufacturers were led to adopt a basis whereby these drawbacks could be obviated and the material should not be submitted to stresses which are too far below the normal load. But this gives rise to constructions which have a heavier weight than actually required. These drawbacks are made still further evident from the fact the material in use is stronger by reason of the resulting diminution of the thickness.

Whence it will ensue that in the case of light constructions of this class it is usually found advantageous to make use of material not possessing any great strength but having a light weight, and in a relatively considerable thickness. In this manner, aluminium and duralumin have been substituted for ordinary or special steels. However, it is a recognized fact that wood is precisely the material which is adapted to afford the best results from the points of view hereinbefore stated, as possessing a small unit strength and great lightness.

The invention has for its object to unite in a given material the various properties which are necessary for the manufacture of light constructions, and for this purpose it relates to the use of substances having a small strength and a very light weight, in order to produce a material which shall possess the qualities of metal, such as absence of deformation, while at the same time affording the desired advantages such as suitable rigidity and absence of bending in even a greater degree than obtained by wood or reinforced timber, but furthermore possessing the new and important qualities of lack of sonority, absence of vibration, facility of assembling and resistance to local stresses.

This invention relates therefore to improvements in material for construction purposes whereby the following objects are attained:

1. A light and strong material applicable to the construction of aircraft of all types either lighter or heavier than air such as aeroplanes, helicopters, balloons, airships or the like, as well as the construction of vehicles of all descriptions such as motor vehicles, vessels and the like, and to various constructions.

2. Various processes of manufacture of the said material.

3. Apparatus, vehicles and like constructions afforded by the use of the said material.

The material possessing lightness and strength which constitutes the principal object of this invention, consists essentially in the combination of the following elements:

1. A reinforcement having a small thickness and constructed of one or several materials having a great inherent strength.

2. A mass of considerable thickness forming a suitable complete body together with the said reinforcement, the said mass having a low density and inherent strength and being preferably not subject to vibrations nor of a sonorous nature.

In practice the reinforcement is constructed of metal, such as steel, aluminium, duralumin, or the like, preferably used in the form of sheets which in some cases may be very thin, for example one-tenth of a millimeter. But the invention is not limited to the said use of metal, and this latter may be replaced by reinforcements constructed entirely or partially of other material, and may even assume the form of reinforcements comprising flexible material such as textile fabrics, paper or the like which in the conditions of construction according to the invention are susceptible of affording a certain rigidity.

The said mass of considerable thickness having a low degree of density and strength which is combined with the said reinforcement is constructed preferably of agglomerated cork, but any other suitable material may be employed such as an especially light wood, magnesia cement, or the like. The intimate connection between the said reinforcement and the mass of considerable thickness combined therewith is preferably effected by the natural adhesion occurring during the molding process in case the said thick material is obtained by this process, or by a subsequent cementing of the reinforcement to the said thick material when the latter is already supplied in the required shape.

When used alone and in the thin condition as herein employed, the said reinforcement which is practically sufficient to support the whole mass would fail to possess the necessary stiffness; it would offer but very little resistance to local stresses, being also difficult to assemble and subject to vibration under the effect of shocks and jarring, besides possessing a great sonority. But when combined with the said light and thick mass of small strength and not subject to vibrations or having a sonorous character, it will afford an assemblage possessing lightness, great strength and a high degree of rigidity, adapted to support local stresses, easily assembled, not subject to vibrations and devoid of any sonorous qualities. From all these considerations, the assemblage thus obtained presents a certain resemblance to reinforced concrete, and its uses are in the same manner as for reinforced concerete of the most varied character, for instance for movable constructions such as aircraft lighter or heavier than air, motor vehicle bodies, hulls of vessels and like constructions.

By way of example, and without limiting the scope of the present invention, the following description will be given wherein are set forth various applications of the process as above stated to the construction of aircraft.

In the construction of such apparatus, the reinforcement is preferably made of aluminium or duralumin, whilst the mass in intimate connection with the frame is of agglomerated cork, which is for instance made up with collodion, casein, tar or the like, or may be even an agglomerate of cork which is carbonized in a closed chamber at high temperature. The said agglomerated cork is given the proper form in suitable molds, and after treatment in the drying chamber and dessication it is removed from the mold. Should it prove necessary, the outer surface is shaped in order to complete the form, or the mass is treated in order to form cut-out portions at suitable points and to increase the lightness, for example by machine cutting. The agglomerated cork is caused to adhere intimately to the aluminium reinforcement either directly by the molding process with the incoporation of elements of the reinforcement in the mass, or by molding with natural adhesion of one reinforcement to the external surface of the agglomerated mass, using for the purpose a suitable agglutinating substance. When elements of the reinforcement are disposed upon the agglomerated mass, the said elements can be caused to adhere by the use of ordinary glue such as strong glue as employed for carpenters' use, or by means of caseine glue, shellac, or fish glue, these being in all cases rendered alkaline, according to the invention. This method will provide various tubes, struts, spars, beams, lifting surfaces, propellers, fuselage and carriage body panels, fuselages for monocoques, that is, fuselages whereof the hull is made in a single piece and the like. Each of these elements of aircraft construction may in turn be obtained by a variety of methods while at the same time remaining within the limits of the invention.

The accompanying drawings are shown solely by way of example, and are in no wise limitative of the scope of the present invention.

Fig. 1 is a perspective view of a tube, Fig. 2 the perspective view of a prismatic bar, and Fig. 3 the perspective view of a fusiform bar, the said tube and bars being adapted to the construction of numerous pieces for avions, helicopters, airships and the like.

Figs. 4, 5 and 6 are views of modified forms of wing beams. Fig. 7 is a perspective view of a lifting surface of small chord for airplanes, and Fig. 8 a perspective view of a similar lifting surface. Fig. 9 is a perspective view of a wing of considerable chord. Fig. 10 is a section of a fuselage panel, and Fig. 11 a section of a like panel.

In Figs. 1, 2 and 3, 1 indicates an aluminium reinforcement which in this case constitutes the external surface of the piece, 2 is the light mass of agglomerated cork having the said reinforcement cemented thereto, the said mass being lightened by one or more spaces 3 whose size is determined for each particular case. The two edges of the metal reinforcement 1 are secured together in any suitable manner, for instance by overlapping and soldering, as supposed in the figures.

Figs. 4, 5 and 6 represent lifting surfaces for airplanes which are constructed according to the invention and are provided with an internal reinforcement which may be used separately or combined with an external band. In Fig. 4 a lifting surface of small chord is constructed by the use of an internal reinforcement constituted by a metal tube 16 which may be of extremely thin metal, a mass of agglomerated cork 17, and an external band 18 formed by a sheet of aluminium or like flexible material such as textile fabric, paper or the like, each of the said frames being cemented to the mass of cork previously molded in two halves of a mold assembled according to the plane of the joint $x-y$; suitable cores may be disposed in the molds in order to provide the lightening spaces 19 in the mass of the agglomerate.

In Fig. 8 a similar lifting surface is obtained by mounting together two masses of cork 20 and 21 according to the plane of adhesion $x-y$, after having disposed between the same a tube 22 which may be made as thin as desired. The masses 20 and 21 may be constructed by the use of the agglomerated cork planks 23 and 24 wherein is first provided the recess which is required to receive the spar 22, the pieces being then cemented together and reduced to the desired outline by dressing down the outer part of the block which is thus formed. The lightness of the lifting surfaces thus obtained may also be increased by forming in the masses of cork 20 and 21 the required spaces 25 by suitable machine treatment.

Lifting surfaces of the herein described types are suitable for example for the construction of multiple plane surfaces or wings of the superposed or Venetian blind type, or by producing surfaces of suitable shape, for the construction of vertical or horizontal empennages or vertical or horizontal rudders. In like manner, the construction will afford struts, propellers or the like.

The same principles may be employed in the construction of large elements of construction for aircraft such as wings, empennages, rudders, monocoque fuselages and the like by direct molding with the incorporation of a combination of framework elements with the mass of cork even during the molding process; thus Fig. 9 shows a wing for avion of normal size or of large size which is constructed in this manner by direct molding, the said wing being constituted by the following elements:

1. A complete frame for wings, comprising a support consisting of the front and rear spars 26, the ribs 27 and the wires or netting 28.

2. A mass of agglomerated and molded cork 29 having imbedded therein the said frame, the mass being caused to adhere strongly to the frame during the molding process.

3. If required, a light and strong envelope 30 surrounds the said mass, as herein represented. The spars 26 may be constructed by the use of elements similar to the bar shown in Fig. 2, the same being formed of a mass of cork which is suitably recessed and has adhering thereto a sheet metal piece.

The spaces 31 similar to the preceding are formed in the cork.

Monocoque fuselages, floats, carriage bodies and the like can be made in a single piece in a similar manner. As above stated, this invention is also applicable to the manufacture of aircraft bodies, walls of fuselages or floats, walls of carriage bodies, various partitions, and the like, by means of panels constructed of the said material according to this invention.

Figure 11:
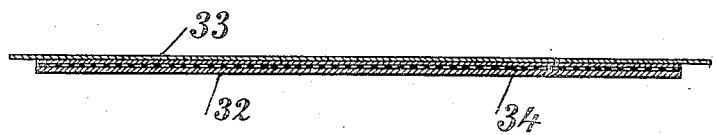

To this effect, for example, as shown in Fig. 10, to a sheet of agglomerated cork 32 is caused to adhere a thin metal sheet 33 or even one or more thicknesses of textile fabric of any suitable kind or like flexible sheet. If desired, the other side of the said cork sheet may be provided with a like coating adhering thereto or as shown in Fig. 11, the said cork sheet may have previously been provided in the interior thereof with a framework constituted for instance by a wire netting 34 or a strong textile fabric.

Having now particularly described and ascertained the nature of our invention, we declare what we claim as new and secure by Letters Patent is:

1. In a beam for aircraft construction, the combination of a mass of considerable thickness and small density molded in such manner as to constitute two soles or flanges assembled by connecting members, together with two metal plates cut out and stamped in such manner as to entirely surround the said mass, the two plates being secured together, substantially as described.

2. In a beam for aircraft construction, a metal frame consisting of a web flanged at right angles in the lengthwise sense angle bars secured to the said web and cooperating with the flanged portion in the lengthwise sense metal envelopes surrounding the upper and lower edges of the said web and oblique envelopes secured to the sides of the web, the said metal frame being combined with a mass having a considerable thickness and small density disposed in the above-mentioned envelopes, substantially as described.

3. In a wing surface of small size, the combination of an apertured mass of considerable thickness and small density with an internal reinforcement formed by a metal tube spar and an external reinforcement constituted by a metal sheet surrounding the said mass and cemented thereto, substantially as described.

4. In a wing surface, the combination of an apertured mass of considerable thickness and small density and having the same general shape as the said wing surface, with a reinforcement whereof certain elements are incorporated with the said mass and comprise spars which are in turn composed of a mass of considerable thickness and small density which is reinforced by a thin framework, substantially as described.

5. In a wing surface for air craft, the combination of an apertured mass of considerable thickness and small density with an internal reinforcement formed by a metal tube spar and an external reinforcement constituted by a metal sheet surrounding the said mass and cemented thereto, substantially as described.

6. In a wing surface for air craft, the combination of an apertured mass of considerable thickness and small density with an internal reinforcement formed by a spar which is in turn composed of a mass of considerable thickness and small density which is reinforced by thin frame work substantially as described.

7. In a wing surface, the combination of an apertured mass of considerable thickness and small density having the same general shape as the said wing surface, a reinforcement whereof certain elements are incorporated with the said mass and comprising spars which are in turn composed of a mass of considerable thickness and small density which is reinforced by a thin framework, substantially as described.

8. A structural unit for aircraft consisting of a mass of considerable thickness and small density molded in such manner as to constitute two soles or flanges assembled by connecting members together with two metal plates cut out and stamped in such manner as to entirely surround the said mass, the two plates being secured together, substantially as described In testimony whereof we have signed our names to this specification.

ALBERT TOUSSAINT.
JEAN JOSEPH MARIE BERTRAND.